United States Patent [19]

Wanger et al.

[11] Patent Number: 5,014,255
[45] Date of Patent: May 7, 1991

[54] OPTICAL DISK CARTRIDGE HANDLING APPARATUS WITH PASSIVE CARTRIDGE ENGAGEMENT ASSEMBLY

[75] Inventors: Mark E. Wanger; Jennifer L. Methlie; David P. Jones; Donald J. Stavely, all of Fort Collins, Colo.

[73] Assignee: Hewlett-Packard Company, Palo Alto, Calif.

[21] Appl. No.: 305,898

[22] Filed: Feb. 2, 1989

[51] Int. Cl.⁵ .................. G11B 17/22; G11B 33/02
[52] U.S. Cl. ..................................... 369/36; 369/77.1
[58] Field of Search ................ 369/36, 37, 38, 39, 369/75.2, 77.1, 34, 77.2

[56] References Cited

U.S. PATENT DOCUMENTS

| | | |
|---|---|---|
| 4,135,245 | 1/1979 | Kemplin et al. . |
| 4,170,030 | 10/1979 | Castrodale et al. ............... 369/38 X |
| 4,417,258 | 11/1983 | Tribolet et al. . |
| 4,573,129 | 2/1986 | Tribolet et al. . |
| 4,608,679 | 8/1986 | Rudy et al. . |
| 4,675,856 | 6/1987 | Rudy et al. ............ 369/34 X |
| 4,685,095 | 8/1987 | Rudy et al. . |
| 4,786,995 | 11/1988 | Stupeck et al. . |
| 4,787,074 | 11/1988 | Deck et al. . |
| 4,797,865 | 1/1989 | Imai et al. ............... 369/39 |
| 4,817,070 | 3/1989 | Hug et al. ............... 369/36 |
| 4,817,071 | 3/1989 | Carlson et al. ............ 369/36 |
| 4,827,463 | 5/1989 | Motoyoshi et al. ............ 369/36 |
| 4,839,758 | 6/1989 | Hontoh ............... 369/34 X |
| 4,853,916 | 8/1989 | Tomita ............... 369/36 |
| 4,879,615 | 11/1989 | Teranishi et al. ............ 369/34 X |
| 4,912,575 | 3/1990 | Shiosaki ............... 369/34 X |
| 4,918,548 | 4/1990 | O'Donnell et al. ............ 369/34 X |

FOREIGN PATENT DOCUMENTS 0067449 6/1982 European Pat. Off. .
2106696 4/1983 United Kingdom .

Primary Examiner—Bentsu Ro

[57] ABSTRACT

A cartridge handling apparatus comprising: a guide assembly for guiding a cartridge engaging assembly along a longitudinally extending cartridge movement path; a longitudinal displacement assembly for displacing the cartridge engaging assembly along the cartridge movement path; and a passively actuated cartridge engaging assembly for latchingly engaging a cartridge, longitudinally displacing the cartridge, and unlatchingly releasing the cartridge.

16 Claims, 5 Drawing Sheets

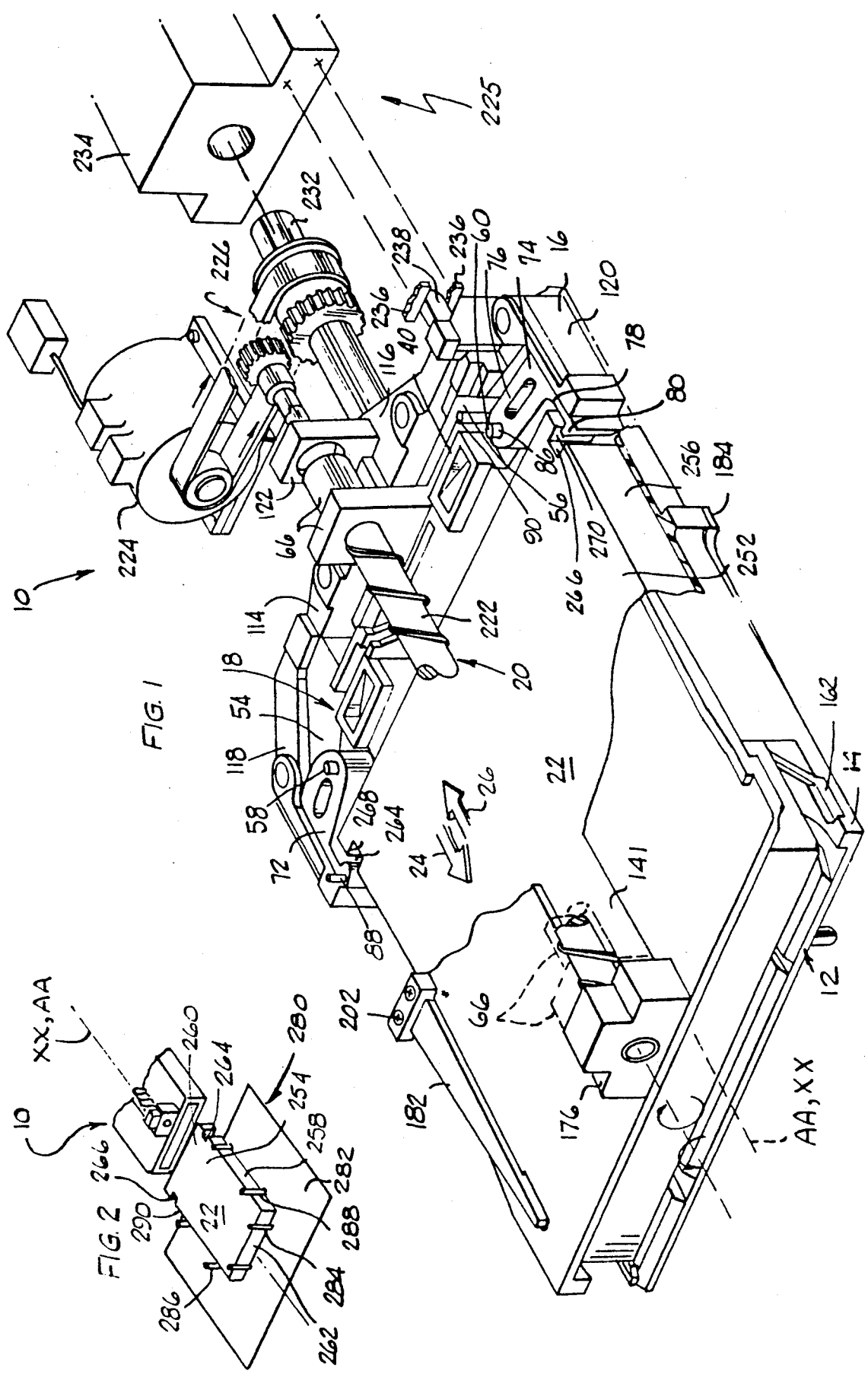

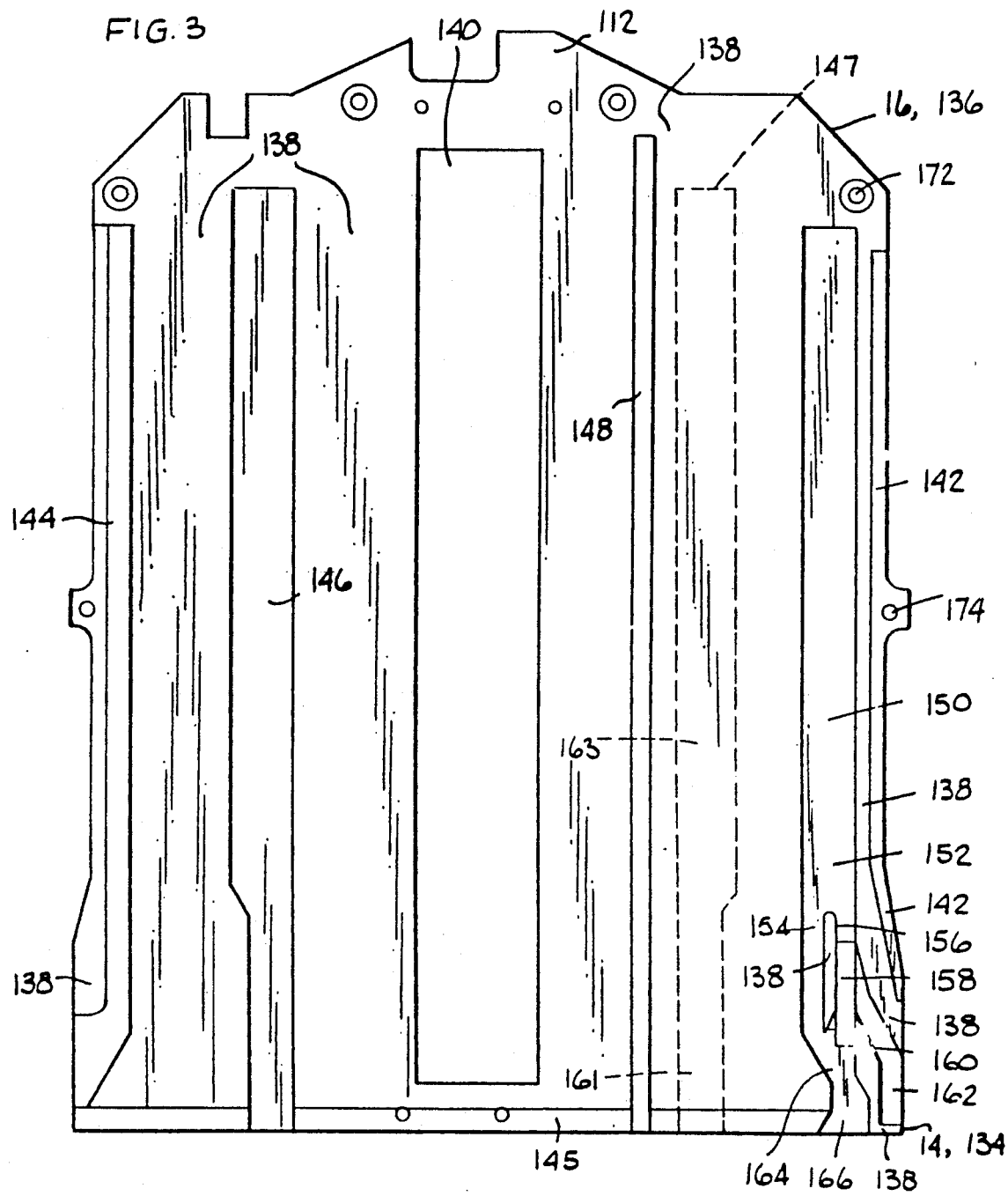

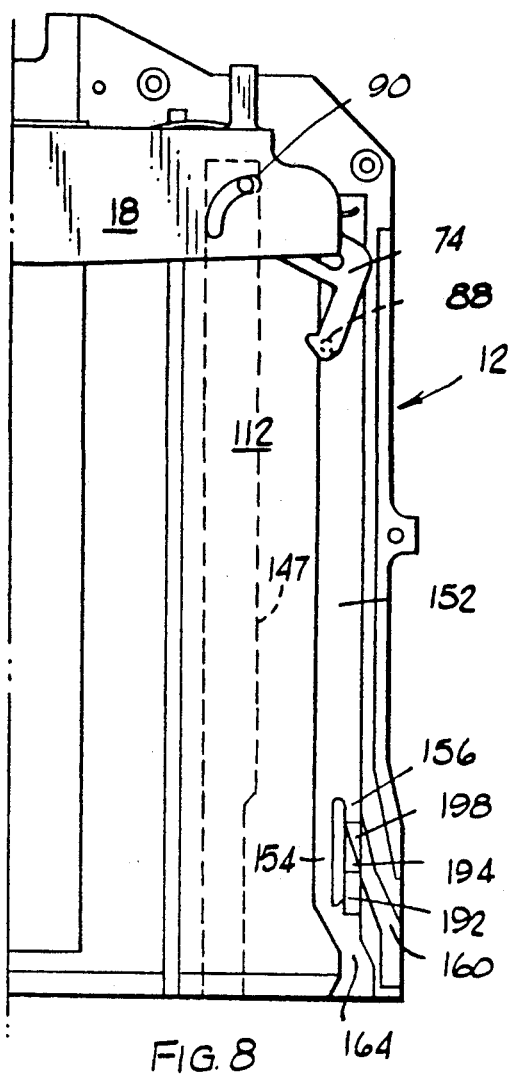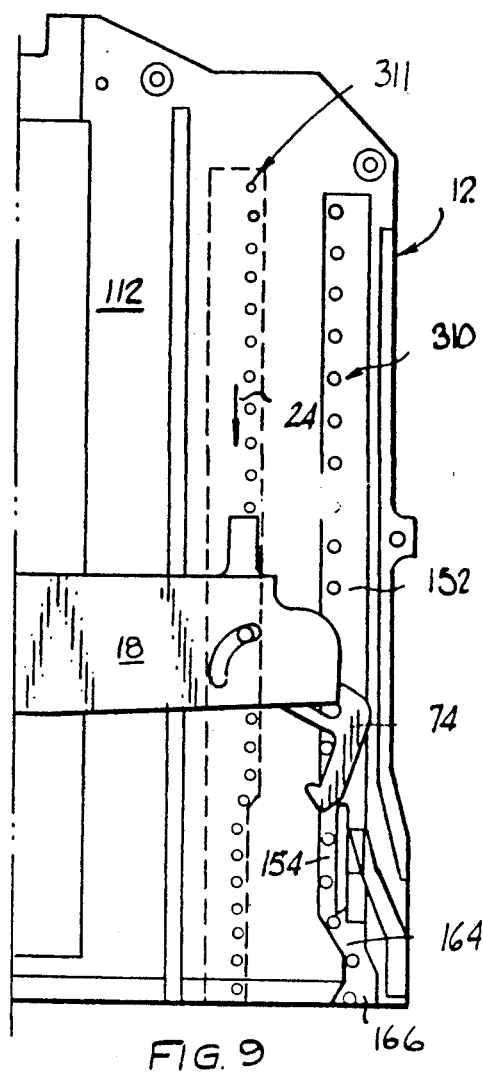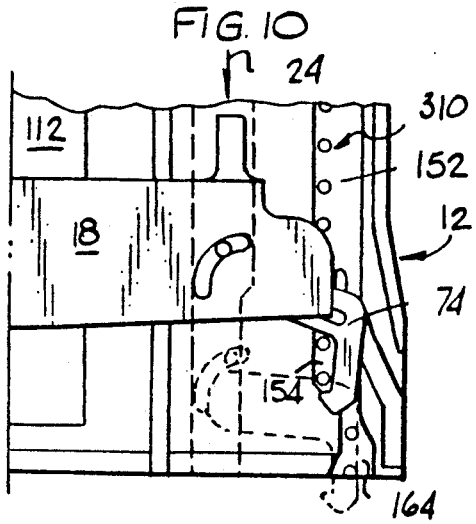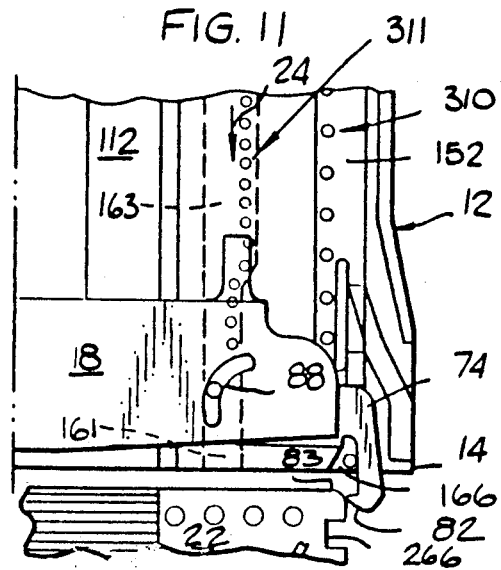

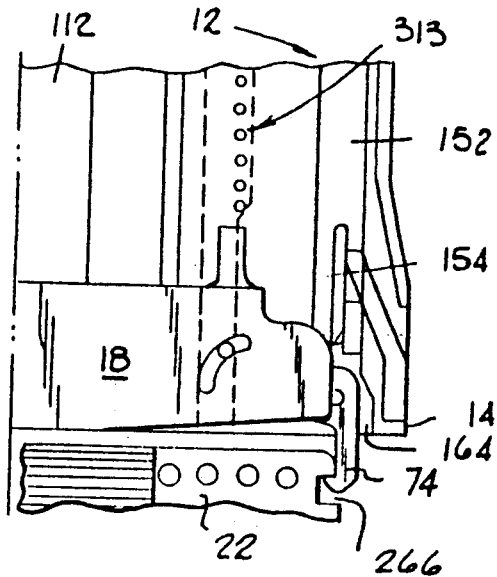
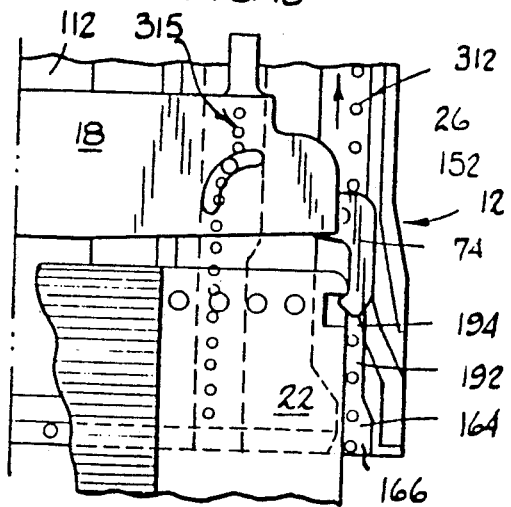
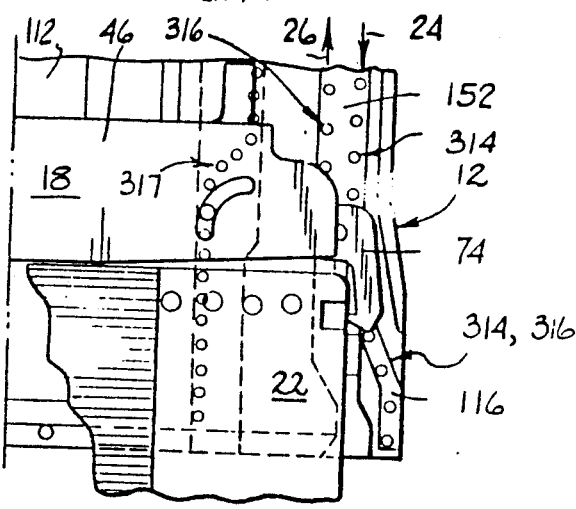
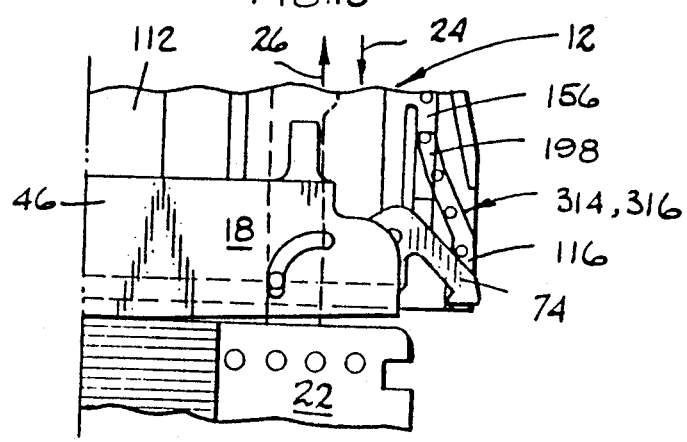

OPTICAL DISK CARTRIDGE HANDLING APPARATUS WITH PASSIVE CARTRIDGE ENGAGEMENT ASSEMBLY

BACKGROUND OF THE INVENTION

The present invention relates generally to apparatus for handling and storing optical disk cartridges and, more particularly, to an apparatus for passively engaging and releasing an optical disk cartridge.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable an computer writable. Thus, in the future, optical disks are expected to become increasingly more important in the computer industry and may eventually replace magnetically readable and writable storage media such as "floppy disks" and "hard disks "Another recent development, the ability to provide data storage on both surfaces of an optical disk, has effectively doubled the optical disk storage capacity.

Optical disks of the type used in computer applications are generally mounted in parallelepiped-shaped cartridges. Optical disk reading devices generally receive a disk which is to be read through a narrow slot provided on the front surface of the device. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader. It may also be necessary for the disk handling system to flip the disk to reverse the side thereof which will be positioned in readable relationship with a reader.

In order to decrease production and maintenance costs and to increase reliability of such a disk handling system, it is generally desirable to reduce the number of separate drive units to a minimum. It is also desirable to minimize or eliminate the type of mechanical systems such as, for example, clutch assemblies, which are particularly subject to malfunction under frequent use conditions. It is also desirable to minimize the use of sensing devices which are particularly subject to malfunction such as, for example, photoelectric or magnetic proximity sensors. It is also desirable to minimize the mounting of sensors or motors on moving system components to eliminate problems associated with moving lead wires, etc.

SUMMARY OF THE INVENTION

The present invention is directed to a cartridge handling apparatus which is adapted to engage a cartridge positioned in a holding device, such as a disk reader or storage slot, and to longitudinally rearwardly displace the cartridge to remove it from the holding device. The invention is further adapted to longitudinally forwardly displace the engaged cartridge to insert it into another holding device and to thereafter release it. A cartridge handling apparatus assembly which engages and releases the cartridge is passively actuated by an assembly which causes the cartridge to be longitudinally displaced. This passive actuation obviates the need for multiple drive units or clutch devices for performing the multiple functions of cartridge engagement, cartridge displacement, and cartridge release.

Thus, the invention may comprise a cartridge handling apparatus including a cartridge engaging assembly, a guide assembly and a longitudinal displacement assembly. The guide assembly is adapted for guiding the cartridge engaging assembly along a longitudinally extending cartridge movement path. The guide assembly has a front end and a rear end which define the direction of cartridge movement. The longitudinal displacement assembly is adapted to forwardly and rearwardly displace the cartridge engaging assembly along the cartridge movement path. The cartridge engaging assembly is adapted to latchingly engage a cartridge, longitudinally displace the cartridge, and unlatchingly release the cartridge. The cartridge engaging assembly has a go-get operating mode wherein the engaging assembly moves forwardly without a cartridge; a retrieve operating mode wherein the engaging assembly moves rearwardly with an engaged cartridge; a put operating mode wherein the engaging assembly moves forwardly with an engaged cartridge; and a return operating mode wherein the engaging assembly moves rearwardly without a cartridge. The engaging assembly is passively actuated to latchingly engage a cartridge positioned adjacent to the forward end of the guide assembly at the end of the go-get operating mode, and is passively actuated to unlatchingly release a cartridge at the end of the put operating mode. The cartridge engaging assembly may comprise a longitudinally displaceable carriage member having a pair of latching members pivotally mounted on lateral end portions thereof. The latching members may be passively actuated by a track assembly which is fixedly associated with the guide assembly. The latching members may also be actuated through coaction between surface portions of the latching members and surface portions of a cartridge which is to be engaged.

BRIEF DESCRIPTION OF THE DRAWINGS

An illustrative and presently preferred embodiment of the invention is shown in the accompanying drawings in which:

FIG. 1 is a perspective view of an optical disk cartridge handling apparatus and cartridge received therein.

FIG. 2 is a perspective view of an optical disk cartridge mounted in a holding device.

FIG. 3 is a top plan view of a lower member of a guide sleeve assembly.

FIG. 4 is a front elevation view of the lower guide sleeve member of FIG. 3.

FIG. 8 is a top plan view of the right half of a cartridge engaging assembly mounted in a guide sleeve assembly with the top guide sleeve member removed for illustrative purposes.

FIG. 9 is a top plan view of the right half of the cartridge engaging assembly guide sleeve assembly of FIG. 8 showing another operating position of the cartridge engaging assembly.

FIGS. 10-15 are top plan views of the front right portions of a guide sleeve assembly and a portion of a cartridge engaging assembly mounted therein with a top guide sleeve member removed, showing various operating positions of the cartridge engaging assembly.

DETAILED DESCRIPTION OF PREFERRED EMBODIMENTS OF THE INVENTION

In General

Figure 5:
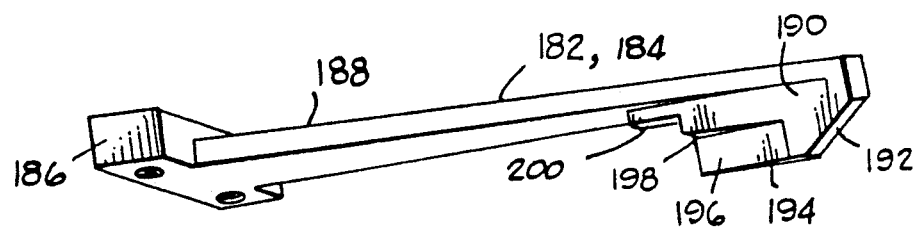
FIG. 5 is a perspective view of a gate member.

A handling apparatus 10 for an optical disk cartridge 22 is illustrated in FIG. 1. The apparatus includes a guide assembly 12 having a forward end 14 and a rear end 16 which is adapted to guide a cartridge engaging assembly 18 along a longitudinally extending cartridge movement path. The apparatus includes a longitudinal displacement means 20 for displacing the cartridge engaging means 18 along the cartridge movement path. The cartridge engaging means 18 is adapted for latchingly engaging a cartridge 22, longitudinally displacing the cartridge, and unlatchingly releasing the cartridge 12. The cartridge engaging means has a "go-get" operating mode, FIGS. 8-12, wherein the engaging means 18 moves forwardly 24 without a cartridge in engagement therewith; a "retrieve" operating mode, FIGS. 12, 13 and 1, wherein said engaging means 18 moves rearwardly 26 with an engaged cartridge; a "put" operating mode, FIGS. 14 and 15, wherein said engaging means 18 moves forwardly 24 with an engaged cartridge; and a "return" operating mode, FIGS. 15, 6, and 14, wherein the engaging means 18 moves rearwardly without a cartridge in engagement therewith.

The engaging means is adapted to latchingly engage a cartridge 22 which is positioned adjacent to the forward end 14 of the guide means 12 at the end of the go-get operating mode, FIG. 12. The engaging means is also adapted to unlatchingly disengage from a cartridge during the last portion of the put operating mode, FIGS. 14 and 15.

Figure 7:
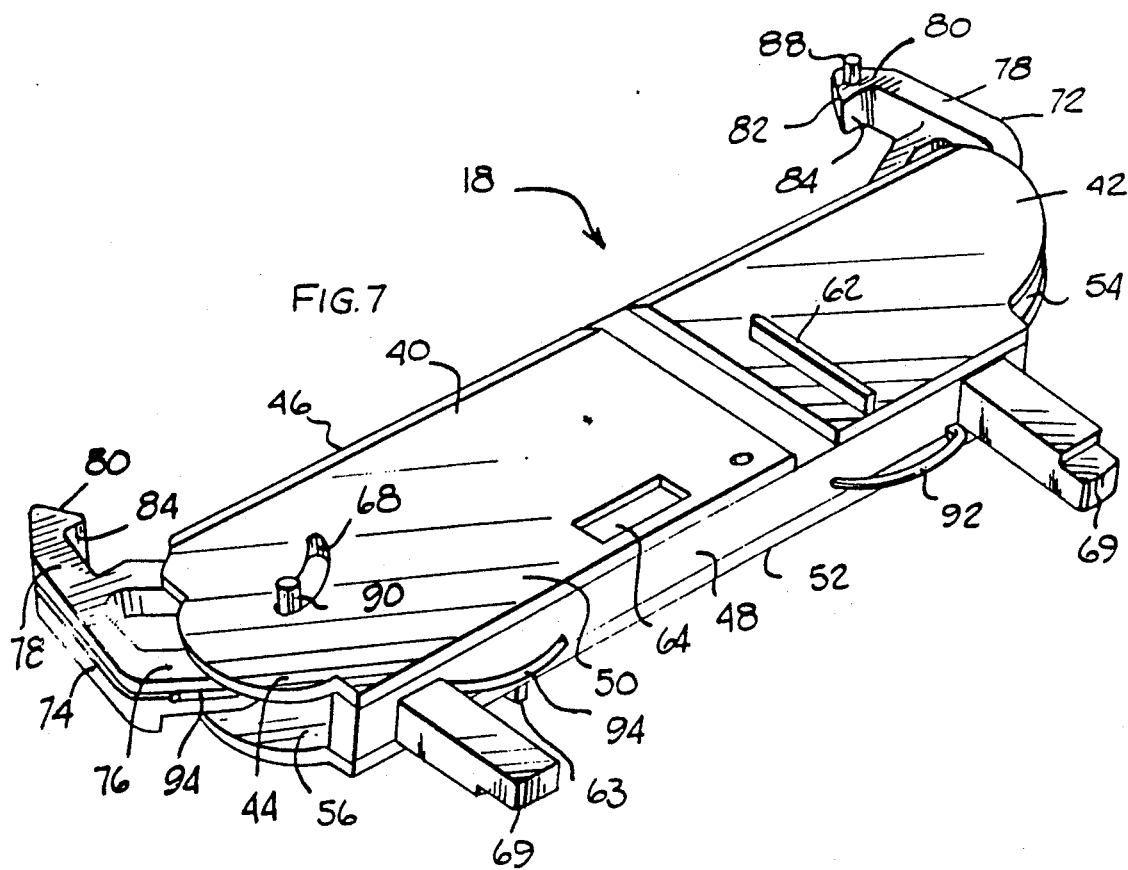
FIG. 7 is a perspective view of a cartridge engaging assembly.

The cartridge engaging means 18 may comprise a carriage member 40 which is guidingly mounted on the guide means and a pair of latch members 72, 74 which are mounted on lateral end portions of the carriage member, FIGS. 1 and 7. The latch members are adapted to engage notch portions 264, 266 provided in the sidewalls of the optical disk cartridge The latch members each have followers 88, 90 mounted thereon which follow track means 150, 147, etc., which passively actuate the latch members ir response to longitudinal displacement of the carriage member 40. The track means provides a different path 310, 312, 314, 316 associated with each of the different operating modes. The latch members 72, 74 are further passively actuated to cause engagement of a cartridge through coaction of surface portions of the latch members with surface portions of the cartridge, FIG. 11.

Having thus described the invention in general, specific features of the invention will now be described in further detail.

Cartridge Engaging Means

As best illustrated in FIG. 7, the cartridge engaging means 18 comprises a carriage member 40 having a first lateral end portion 42, a second lateral end portion 44, a forward end portion 46, a rear end portion 48, a top end portion 50, and a bottom end portion 52. The carriage member comprises a first outwardly opening lateral end interior cavity 54 and a second outwardly opening lateral end interior cavity 56 which are adapted to receive the latch members 72, 74 therein. FIG. 1 shows the carriage member 40 with a top panel portion thereof removed. A first pivot post 58 is positioned in the first cavity 54, and a second pivot post 60 is positioned in the second cavity 56. As illustrated in FIG. 7, a longitudinally extending guide rib 62 is provided on an upper surface of the carriage member 40. An identical guide rib 63 is positioned on the bottom portion of the carriage member in mirror-image relationship with the top guide rib 62, i.e. the bottom guide rib is positioned the same distance from the second lateral end portion 44 that the top rib 62 is positioned from the first lateral end portion 42 The lower rib 63 is adapted to be received in lower sleeve member channel portion 148, and the upper rib 62 is adapted to be received in a channel portion in the top sleeve member which corresponds to channel 148, as described in further detail below. An attachment recess 64 is provided on the top portion of carriage member 40 for facilitating attachment of a threaded nut member 66, FIG. 1, by conventional attachment means. The threaded nut portion 66 is adapted to threadingly receive a worm drive screw 222 for enabling longitudinal displacement of the carriage member 40 with respect to the guide means 12 as described in further detail below. A cutout portion 68 is provided in the top portion 50 of carriage member 40 for enabling arcuate displacement of a latch stud portion 90 as described in further detail below. An identical cutout portion is provided in the bottom portion 52 of the carriage member 40 in the same relationship with the first lateral end portion 44 as that which cutout 68 occupies with respect to the second lateral end portion 44. Rear projections 69 are adapted to be received in bores (not shown) extending through a rear portion of the guide sleeve assembly 12. In one preferred embodiment, the top end portion 50 and the bottom end portion 52 are identical in construction and are fixedly attached to one another as shown in FIG. 7 to form the carriage member 40.

The cartridge engaging means 18 comprises a pair of generally L-shaped latch members 72, 74. Each latch member has a generally laterally extending portion 76 and a generally longitudinally extending portion 78 integrally formed with the laterally extending portion. A generally laterally extending hook portion 80 is provided at the end of the longitudinally extending portion 78 and projects laterally inwardly therefrom. Each hook portion comprises an inwardly and rearwardly projecting beveled surface 82 and a laterally inwardly projecting surface 84. Each of the latch members is mounted on a associated post member 58, 60 by a post receiving bore 86 provided through an inner end of the laterally extending portion 76 thereof. Each latch member has a first stud portion 88 projecting from the hook portion thereof and a second stud portion 90 projecting from an inner end of the laterally extending portion 76 thereof. On latch member 72, the first stud portion 88 projects upwardly and the second stud portion 90 projects downwardly. On the second latching member 74, the first stud portion 88 projects downwardly and the second stud portion 90 projects upwardly. In a preferred embodiment of the invention, the latch members 72, 74 are identical in construction. Biasing springs 92, 94 are provided which engage the latch members 72, 74, urging the hook portions 80 thereof inwardly. The carriage member cutouts 68 (only one shown) enable arcuate displacement of the stud members 90 associated with each latch member and also limit the total amount of pivotal movement of each latch member. Each latch member has a latching operating position, FIGS. 1 and 12, wherein the hook surface 84 thereof is positioned in longitudinal alignment with a catch surface 268, 270 of an associated cartridge 22 which is aligned with the apparatus 10. Each latching member has an inwardly deflected operating position, FIGS. 7, 8 and 9, wherein surface 84 is positioned laterally inwardly of its location in the latching operating position. Each of the latch members also has at least one outwardly deflected operating position, FIGS. 11, 14 and 15, wherein surface 84 is positioned laterally outwardly of an associated catch surface 268, 270 of an aligned cartridge. The spring biasing members 92, 94 bias the latch members toward the inwardly deflected operating position illustrated in FIGS. 7, 8 and 9.

Guide Assembly

The guide assembly 12 may comprise a sleeve assembly consisting of an upper guide sleeve member 110, a lower guide sleeve member 112 (which in one preferred embodiment is of identical construction to the upper guide sleeve member), and a yoke member 114, FIG. 1.

The yoke member 114 is generally U-shaped, comprising a central body portion 116 and a pair of forwardly projecting wing portions 118, 120. A worm screw mounting member 122 is mounted on an upper surface of the central body portion 116 and may be integrally formed therewith. The yoke member may have a pair of holes therein (not shown) for receiving rear projecting portions 69 of the carriage member therethrough, as described in U.S. Pat. application Ser. No. 278,102 filed Nov. 30, 1988, of Methlie, Oliver, Stavely, and Wanger, for OPTICAL DISK HANDLING APPARATUS WITH FLIP LATCH, which is hereby specifically incorporated by reference for all that is disclosed therein FIGS. 3 and 4 show a top plan view and a front elevation view of lower guide sleeve member 112 The lower guide sleeve member comprises a forward end 134 and a rear end 136 corresponding to the forward and rear end portions 14, 16 of the guide assembly. The lower guide sleeve member comprises a planar top surface 138 A longitudinally extending cutout 140 is provided in a central portion of the member 112. A corresponding cutout 141, FIG. 1, in the upper member 110 enables longitudinal displacement of carriage threaded nut portion 66, as described in further detail elsewhere herein. The lower guide sleeve member 112 comprises an upstanding lateral wall portion 142 on the right side thereof and an upwardly projecting lateral rib portion 144 on the left side thereof. The wall portion may extend approximately 0.6 inches above surface 138 and the rib portion may extent approximately 0.1 inches above top surface 138. The member comprises a downwardly and forwardly beveled front lip portion 145. The lower member top portion has a first longitudinally extending recessed channel 146, a second longitudinally extending recessed channel 148, and a third longitudinally extending recessed channel 150 therein. Each of the channels 146, 148, 150 has a bottom surface 151 positioned parallel to planar surface 138. Each of the bottom surfaces 151 may be positioned approximately 0.1 inch below top planar surface 138. The third channel 150 comprises a first relatively broad rear portion 152. A second and third portion 154, 156 branch from the first portion 152. The third portion 156 comprises a longitudinally extending cutout 158 which extends entirely through the lower member 112 and which is adapted to receive a head portion of a gate member therein, as described in further detail below. A fourth portion 160 branches from the cutout region 158 of the third portion 156. The fourth portion terminates in a lateral side opening 162. A fifth portion 164 extends forwardly from the forward ends of the second portion 154 and from the cutout region 158 of the third portion 156. The fifth portion 164 terminates in a forward opening 166. A plurality of vertically extending threaded bores 172, 174, etc , are provided about the periphery of the lower member 112 for enabling attachment thereof to the upper guide sleeve member 110 and yoke member 114 by screws (not shown)

Upper guide sleeve member 110, in one preferred embodiment of the invention, is identical in construction to lower guide sleeve member 112. In the preferred embodiment, the construction of the members 110 and 112 are such that when the upper member is positioned directly above the lower member with the upper member sidewall portion projecting downwardly, the two members 110, 112 form a generally parallelepiped-shaped enclosure of sufficient dimension to receive an optical disk cartridge therein In one preferred embodiment, the lateral dimension of the enclosure between sidewall portions thereof is approximately 5.7 inches, and the length of the enclosure extending from the forward wall of the central body portion of the yoke member to the forward edge of the guide sleeve members is approximately 7.7 inches. The length of the guide sleeve members 110, 112 may be sufficiently long such that when the cartridge engaging means 18 is positioned in its rearwardmost position illustrated in FIGS. 1 and 8 and when a cartridge is engaged therewith as illustrated in FIG. 1, the forward end of the cartridge is positioned approximately ¼ inch from the forward edge of the guide sleeve members 110, 112.

FIG. 3 shows the relative position of the channel 147 in the upper guide sleeve member 110 which corresponds to channel 146 in the lower guide sleeve member 112. Upper guide sleeve member channel 147 is adapted to receive engaging means latch member upwardly projecting stud 90 therewithin, and lower guide member channel portion 150 is adapted to receive latch member 74 lower stud 88 therein for producing lateral deflection of latch member 74 in response to longitudinal displacement of the engaging means carriage member 40. Similarly, lower member recess 146 is adapted to receive the downwardly projecting stud member 90 of the latch member 72 and a portion of the upper guide sleeve member 110 corresponding to channel 150 is adapted to receive upwardly projecting stud portion 88 of the latch member 72 therein.

Gate Members

As best illustrated in FIG. 1, a pair of identical gate members 182, 184 are attached to upper and lower surfaces of the guide means 12. Each gate member comprises an attachment portion 186, an elastically resilient neck portion 188 which may be integrally formed with the attachment portion, and a head portion 190 which may be integrally formed with the neck portion 188. The head portion 190 is adapted to project into an associated guide sleeve member cutout portion 158.

Each head portion comprises a beveled end surface 192, a horizontal top surface 194, a beveled side surface 196, and a horizontal intermediate surface 198. A horizontal lower abutment surface 200 is provided on the neck portion for limiting the penetration of the head portion into the associated cutout 158. Each member 182, 184 may be attached to an associated guide sleeve member as by attachment screws 202.

Figure 6:
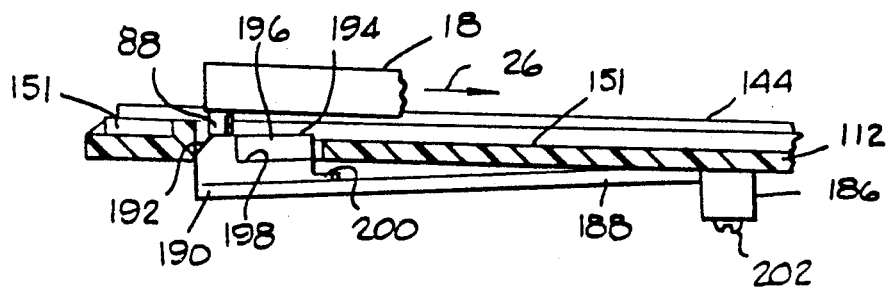
FIG. 6 is a detail, partially cross-sectional, side elevation view of a gate member mounted on a lower guide sleeve member.

The ordinary bias position of the gate members 182, 184 is illustrated in FIG. 1, in which abutment surface 200 is positioned in abutting engaging with the outer surface of an associated sleeve member. In this position, the forward edge of beveled surface 192 is positioned at the same elevation as the bottom surface 151 of channel 150. However, as illustrated in FIG. 6, when the engagement means 18 is moving rearwardly 26, a stud portion 88 of the associated latch member which engages gate beveled end surface 192 will cause the gate head portion 190 to be deflected downwardly, enabling the stud 88 to ride over the horizontal top surface 194 thereof. As soon as the stud 88 passes out of engagement with surface 194, the gate head portion again moves upwardly into its normal bias position. In this normal bias position, a stud portion 88 of a forwardly 24 moving gate member moving through channel portion 156 will ride over gate horizontal intermediate surface 198 and will be laterally deflected by gate beveled side surface 196, causing the stud 88 to be moved from channel portion 156 to channel portion 160. In one preferred embodiment of the invention, the gate member is constructed from a high-strength, resilient plastic and has an overall length of approximately 3.7 inches. The head portion of the gate may have an overall length of approximately 0.7 inches.

Longitudinal Displacement Means

As best illustrated in FIG. 1, the longitudinal displacement means 20 may comprise a conventional worm screw 222 which is journaled to members 122 and 176 and which is adapted to drive cartridge engaging means nut portion 66 therebetween, as illustrated in solid and phantom lines in FIG. 1. The worm screw may be driven by a reversible electric motor 224 which is mechanically linked to the screw by a transmission assembly such as illustrated at 226 in FIG. 1 and which may be identical to that described in detail in U.S. Pat. application Ser. No. 278,102 of Methlie et al. incorporated by reference above.

Guide Assembly Supporting Assembly

A guide assembly supporting assembly 225 may be provided for supporting the guide sleeve assembly 12 in rotatably nondisplaceable relationship therewith. As illustrated in FIG. 1, the supporting assembly may comprise a shaft 232 which has a first end fixedly attached to a rear end portion of the guide assembly yoke member 114 and which is received at a second end thereof in a block 234. A latch assembly 236 which is operably attached to block 234 may engage a rearwardly projecting stud 238 which is fixedly attached to a rear end portion of the yoke member 114. The guide assembly supporting assembly may be identical to that described in detail in Methlie et al., U.S. Pat. application Ser. No. 278,102 incorporated by reference above. The supporting assembly 225 may, in turn, be mounted in a laterally and vertically displaceable assembly (not shown) for enabling the guide assembly 12 to be positioned in axial alignment with a cartridge which is to be engaged thereby. This laterally and vertically displaceable assembly may be identical to that described in U.S. Pat. application Ser. No. 298,388 filed Jan. 18, 1989, of Wanger, Methlie, Stavely, and Oliver for LATERAL DISPLACEMENT CONTROL ASSEMBLY FOR AN OPTICAL DISK HANDLING SYSTEM, which is hereby specifically incorporated by reference for all that is disclosed therein.

As illustrated in FIGS. 1, 2 and 11–15, the cartridge 22 which the apparatus 10 is adapted to engage may comprise a conventional, computer-readable, double-sided, optical disk cartridge having a generally parallepiped shape with a generally planar top surface 252; a generally planar bottom surface 254; a generally planar, longitudinally extending, first lateral side surface 256; and a generally planar, longitudinally extending, second lateral side surface 258; and having a front end portion 260 and a rear end portion 262. The cartridge has oppositely positioned first and second notch portions 264, 266 located in the lateral sidewalls 256, 258 at the forward ends thereof which are adapted to ordinarily facilitate positioning of the cartridge in a conventional cartridge reading device (not shown). However, it is a feature of the present invention that such notch portions are used to enable engagement and transfer of the cartridge 22 through abutting engagement of first and second notch laterally extending surface portions 268, 270 by surface portions 84 of latch member 72, 74. The cartridge 22 may be an ISO (International Standards Organization) standard five and one quarter inch optical cartridge.

As illustrated in FIG. 2, the apparatus 10 is adapted to be positioned adjacent to, e.g. 0.5 inch rearwardly of, a cartridge in a handling device 280, with the central longitudinal axis AA thereof in alignment with the central longitudinal axis XX of the cartridge. The holding device 280 may comprise a horizontal support surface 282, a rear abutment surface 284, a pair of lateral side surfaces 286, 288, and a rear opening 290 which exposes notch portions 264, 266 of a cartridge 22 received therein to engaging means 18.

Operation

The cooperation between latch member 72 and the channel portions associated therewith is identical to the cooperation between latch member 74 and the channel portions associated therewith, thus it will not be necessary to describe the operation of both latch members 72, 74 in detail, and FIGS. 8–14 depict the operation of only the right-hand portion of the engaging means 18 and guide means 12.

In a go-get operating mode, the engaging means 18 does not have a cartridge in engagement therewith. The engaging means is movable from a rearmost position, as illustrated in FIG. 8, to a forwardmost position, as illustrated in FIG. 12. In one preferred embodiment, in the rearmost position, the threaded nut 66 is in engagement with worm drive mounting member 122 and the engaging means carriage portion is in abutting engagement with the yoke member 114. In the forwardmost position, the nut 66 may be in engagement with the forward worm screw mounting member 176, and the forward edge of the engaging means 18 may be positioned slightly past the forward edge of the guide means 18. During the go-get operating mode, the lower stud portion 88 of latch member 74 moves along a first path 310 comprising third channel portions 152, 154 and 164. As best illustrated in FIGS. 11 and 12, during the go-get operating mode, the upper stud portion 90 moves along an upper stud first path 311 in upper guide member channel portion 147. The engagement of the upper stud 90 with the right edge surface of the narrow forward portion 161 of channel 147 prevents the latch member 74 from pivoting inwardly from its latching position even after the lower stud 88 moves forwardly beyond opening 166, enabling the latch member forward beveled surface 82, FIG. 11, to engage a rounded corner surface 83 of the aligned cartridge 22 and to be deflected outwardly by a rounded corner surface 83 thereof Thereafter, further forward movement of the engaging means 18 and the biasing force exerted on the latching member 74 by the biasing spring causes the latch member hook portion 80 to move into associated cartridge notch 266, FIG. 12.

Next, as illustrated in FIG. 13, in the retrieve operating mode forward movement of the engaging means causes abutting engagement between the latch means hook surface 84 and the cartridge notch surface 270, resulting in rearward displacement of the cartridge 22 by the engaging means 18. During this rearward 26 movement associated with the retrieve operating mode, the lower stud portion 88 moves along a lower stud second path 312 including channel portion 164, gate surfaces 192, 194, channel portion 156, and channel portion 152 until the engaging means reaches the position illustrated in FIG. 1. The upper stud 88 moves along a corresponding path 313 in channel 147.

Next, in the put operating mode, the engaging means moves forwardly 24 with the lower stud 88 following a lower stud third path 314 including channel portion 152, 156, gate portion 198, and channel portion 160, and the upper stud follows a corresponding upper path 315 Gate portion 198 and channel portion 160 cause the latch member 74 to be displaced outwardly, releasing the cartridge as illustrated in FIGS. 14 and 15. After release of the cartridge as illustrated in FIG. 13, the cartridge continues to moved forwardly through abutting contact with the forward portion of the carriage member 40 until the engaging means 18 nears its most forward position illustrated in FIG. 15. At the position illustrated in FIG. 15, the associated cartridge 22 has been fully inserted in its associated holding device 280.

Next, as illustrated in FIGS. 14 and 13, the engaging means moves rearwardly 26, with the lower stud 88 following a lower stud fourth path 316 including channel portion 160, gate surface portion 196, channel portion 156, and channel portion 152, and the upper stud following a corresponding upper stud path 317, until the engaging means 18 returns to a rear position such as the rearmost position illustrated in FIG. 8. Thus, a full operating cycle of the apparatus is completed and the engaging means 18 is positioned to begin a new cycle of operation.

In one preferred embodiment, the entire apparatus may be moved from alignment with one holding location to alignment with another holding location and the guide means may be rotated 180° about its longitudinal axis between the retrieve operating mode and the put operating mode. Apparatus for performing these functions are described in Methlie et al. and Wanger et al., U.S. Pat. application Ser. Nos. 278,102 and 298,388, incorporated by reference above.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:
1. A cartridge handling apparatus comprising:
  (a) guide means having a forward end and a rear end for guiding a cartridge engaging means along a longitudinally extending cartridge movement path;
  (b) longitudinally displacement means for displacing said cartridge engaging means along said cartridge movement path;
  (c) said cartridge engaging means for latchingly engaging a cartridge, longitudinally displacing said cartridge, and unlatchingly releasing said cartridge; said cartridge engaging means having:
    (i) a go-get operating mode wherein said engaging means moves forwardly without a cartridge;
    (ii) a retrieve operating mode wherein said engaging means moves rearwardly with an engaged cartridge;
    (iii) a put operating mode wherein said engaging means moves forwardly with an engaged cartridge;
    (iv) a return operating mode wherein said engaging means moves rearwardly without a cartridge; and
    (v) said engaging means being adapted to latchingly engage a cartridge positioned adjacent said forward end of said guide means at the ned of said go-get operating mode, and being adapted to unlatchingly release a cartridge at the end of said put operating mode;
    said cartridge engaging means comprising:
      carriage means guidingly mounted on said guide means for enabling guided movement of said cartridge engaging means along said guide means; and
      latch means deflectably mounted on said carriage means for latchingly engaging and unlatchingly releasing cartridge catch means;
    said latch means comprising a first latching member having a first end portion attached to said carriage means and a second end portion having a latching surface therein adapted to latchingly engage a first catch surface of said cartridge catch means.

2. The invention of claim 3 wherein said first latching member is laterally deflectable and having:
  (a) a latching operating position wherein said latching surface is positioned in longitudinal alignment with said first catch surface of said cartridge catch means of a cartridge which is aligned with said apparatus;
  (b) an inwardly deflected operating position wherein said latching surface is positioned laterally inwardly of its location in said latching operating position;

(c) an outwardly deflected operating position wherein said latching surface is positioned laterally outwardly of said first catch surface of said cartridge catch means of said aligned cartridge; and (d) said first latching member being biased toward said inwardly deflected operating position.

3. The invention of claim 2 further comprising:

passive actuating means for passively actuating said first latching member through longitudinal displacement of said carriage means.

4. The invention of claim 3, wherein said passive actuating means comprising beveled surface means on said first latching member second end portion, and adapted to coact with an end portion of a cartridge for deflecting said first latching member into said outwardly deflected operating position.

5. The invention of claim 3, wherein said passive actuating means comprising:

first latching member track means fixedly associated with said guide means for laterally deflecting said first latching member relative said carriage means in response to longitudinal movement of said carriage means along said guide means; and first latch follower means attached to said first latching member for following said track means.

6. The invention of claim 5, wherein said first latching member track means comprising:

go-get path means followed by said first latch follower means during said go-get operating mode for displacing said first latching member from said inwardly deflected operating position to said latching operating position.

7. The invention of claim 6, wherein said first latching member track means comprising:

retrieve path means followed by said first latch follower means in said retrieve operating mode for maintaining said first latching member in said latching operating position.

8. The invention of claim 7, wherein said first latching member track means further comprising:

put path means followed by said first latch follower means in said operating mode for displacing said first latching member from said latching operating position to said outwardly deflected operating position for enabling disengagement of a cartridge.

9. The invention of claim 8, said first latching member track means further comprising:

return path means followed by said first latch follower means for enabling biased return displacement of said first latching member from said outwardly deflected operating position.

10. The invention of claim 9 wherein said first latching member comprises:

beveled surface means on said second end portion of said first latching member for rampingly engaging an end portion of an aligned cartridge during said go-get operating mode for causing deflection of said first latching member into said outwardly deflected operating position for enabling engagement of said cartridge.

11. The invention of claim 9, wherein said retrieve, put, and return path means comprising a common deflectable gate member.

12. The invention of claim 11, wherein said deflectable gate member having a first surface portion followed by said first latch follower means during movement along said put and return path means and comprising a different second surface portion followed by said first latch follower means during movement along said retrieve path means.

13. The invention of claim 5, wherein said first latching member track means comprising:

retrieve path means followed by said first latch follower means in said retrieve operating mode for maintaining said first latching member in said latching operating position.

14. The invention of claim 5, wherein first latching member track means comprising:

put path means followed by said first latch follower means in said put operating mode for displacing said first latching member from said latching operating position to said outwardly deflected operating position for enabling disengagement of a cartridge.

15. The invention of claim 5, wherein said first latching member track means comprising:

return path means followed by said first latch follower means for enabling biased return displacement of said first latching member from said outwardly deflected operating position.

16. The invention of claim 5, wherein said first latching member comprises:

beveled surface means on said second end portion of said first latching member for rampingly engaging an end portion of an aligned cartridge during said go-get operating mode for causing deflection of said first latching member into said outwardly deflected operating position for enabling engagement of said cartridge.

* * * * *